DOUBLE REFUSE CAN HOLDER

Original Filed June 3, 1968 2 Sheets-Sheet 1

INVENTOR
CHARLES R. BAILEY

BY
Burns Doane Benedict Swecker + Mathis
ATTORNEYS

DOUBLE REFUSE CAN HOLDER

Original Filed June 5, 1968 2 Sheets-Sheet 2

INVENTOR
CHARLES R. BAILEY

BY
Burns Doane Benedict Swecker & Mathis
ATTORNEYS

United States Patent Office

Re. 27,437
Reissued July 18, 1972

27,437

DOUBLE REFUSE CAN HOLDER

Charles R. Bailey, Charleston Heights, S.C., assignor to F. F. Murphy, Cainhoy, S.C.

Original No. 3,479,047, dated Nov. 18, 1969, Ser. No. 734,058, June 3, 1968. Application for reissue Aug. 10, 1970, Ser. No. 62,732
Int. Cl. B62b *1/18, 1/26*
U.S. Cl. 280—47.19 11 Claims

Matter enclosed in heavy brackets [ ] appears in the original patent but forms no part of this reissue specification; matter printed in italics indicates the additions made by reissue.

ABSTRACT OF THE DISCLOSURE

A portable multiple refuse can holder of a generally wheelbarrow-like construction and having transversely hinged refuse can cover securing means latchable to prevent access by animals and accidental spillage of the contents of the refuse cans while transporting the cans by means of the holder.

Background of the invention

Portable multiple refuse can holders are well known in the art. These holders in general are of a wheelbarrow-like construction and comprise a tubular frame having a pair of wheels journaled on an axle on the forward end thereof and a pair of rearwardly facing handles at the rear end thereof. A pair of depending support elements is usually provided at the rear end of the holder. U.S. Patents, Nos. 3,111,333 and 3,379,451 to T. O. Marini et al. and No. 3,306,464 to J. W. Rogers illustrate representative examples of this type of prior art refuse can holder.

Refuse can holders of the type above described generally lack means for securing the tops of the refuse can thereon to prevent access by animals or the accidental spillage of the contents of the cans during the transportation by the holder. A prior art practice has been to attach flexible chains to the handles of the refuse can covers and to the frame of the portable refuse can holder. While this practice may prevent the misplacing of the covers, it is clearly ineffective in preventing the removal of the covers by animals or the accidental spillage of the contents of the refuse cans when jostled during their transporting. U.S. Patents Nos. 3,276,600 and 3,280,988 issued to H. W. Black and V. O. Bennett, respectively are illustrative of prior art holders with which this practice has been adopted.

Other prior art holders have provided means for individually securing the covers to the refuse cans carried by the holder as illustrated in U.S. Pats. Nos. 3,235,213 to W. E. Hall and 3,292,795 to J. W. Chappell. The portable refuse can holders of this type in general comprise an upstanding member at the front and rear of the holder and rather intricate mechanical means, often spring biased, for hinging a rigid arm thereto along the axis of the holder. The rigid arms are customarily secured to the handle of the refuse can cover. Such refuse can cover securing means have a disadvantage in that the individual refuse cans cannot be removed from the holder with their covers in place without first detaching the cover from the rigid arm. This procedure may be quite time consuming and may also require the use of hand tools. Since it may be desirable to use one of the refuse cans from time to time in a location separate from the holder, this disadvantage often constitutes a serious inconvenience.

It is accordingly an object of the present invention to provide a novel, multiple unit, portable refuse can holder in which the covers may be retained on the refuse cans to prevent access by dogs and other animals, and to prevent the accidental spillage of the contents thereof while transporting the cans in the holder.

Another object is to provide a novel, multiple unit portable refuse can holder in which an individual refuse can may be selectively removed from the holder with its cover in place thereon.

Yet another object is to provide a novel portable holder for multiple refuse cans having a simplified, lightweight and sturdy construction.

A still further object of the present invention is to provide a novel portable double refuse can holder so designed and constructed that it can be packaged and sold in knockdown form and quickly and easily assembled by the purchaser.

These and other objects and advantages of the present invention will become apparent from the appended claims and upon a reading of the following detailed description in conjunction with the drawings.

The drawings

Detailed description

Figure 1:
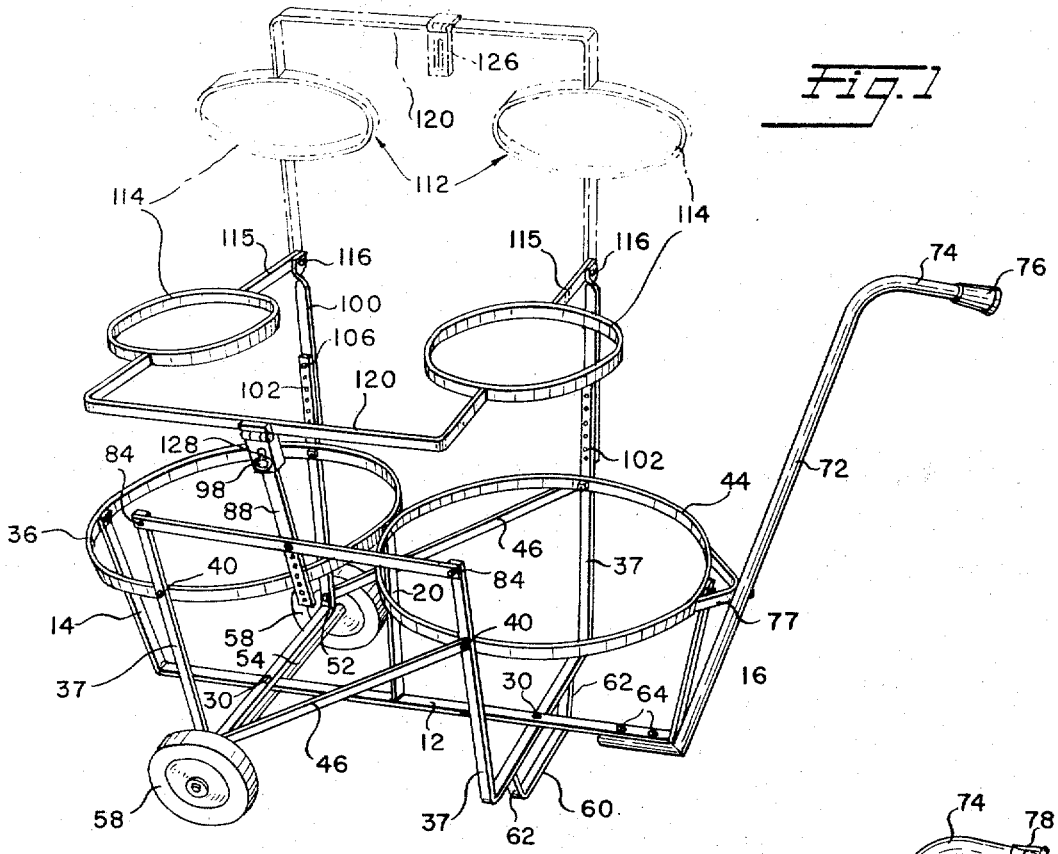
FIGURE 1 is a pictorial view of the portable refuse can holder of the present invention.
Figure 2:
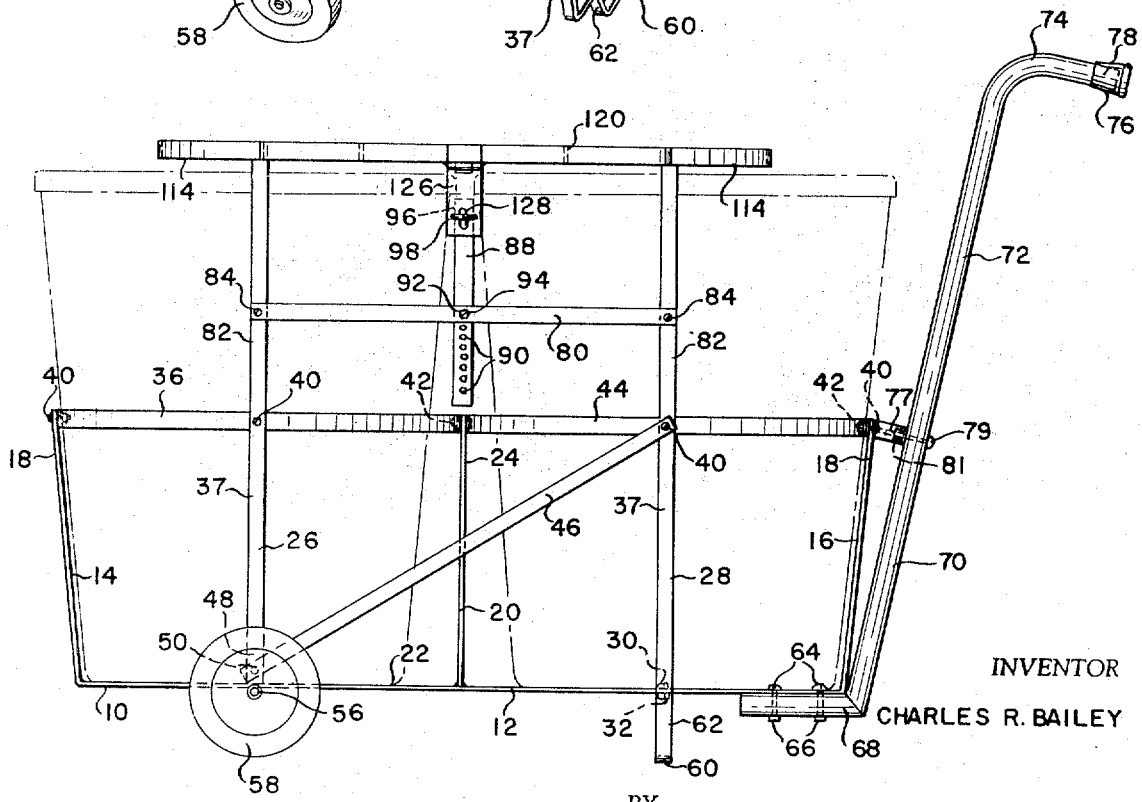
FIGURE 2 is a side elevation of the portable refuse can holder.
Figure 3:
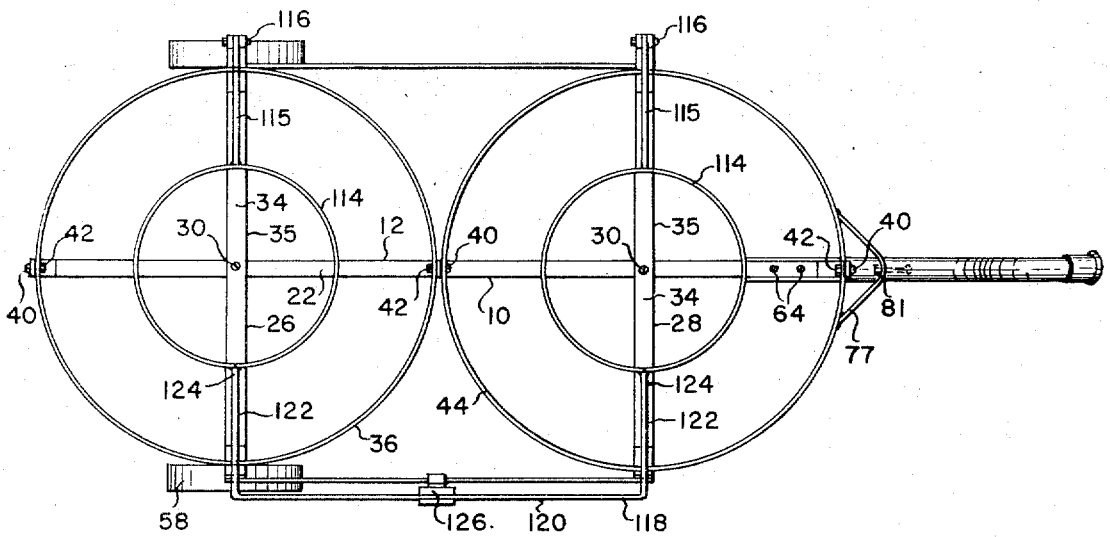
FIGURE 3 is a plan view of the portable refuse can holder.
Figure 4:
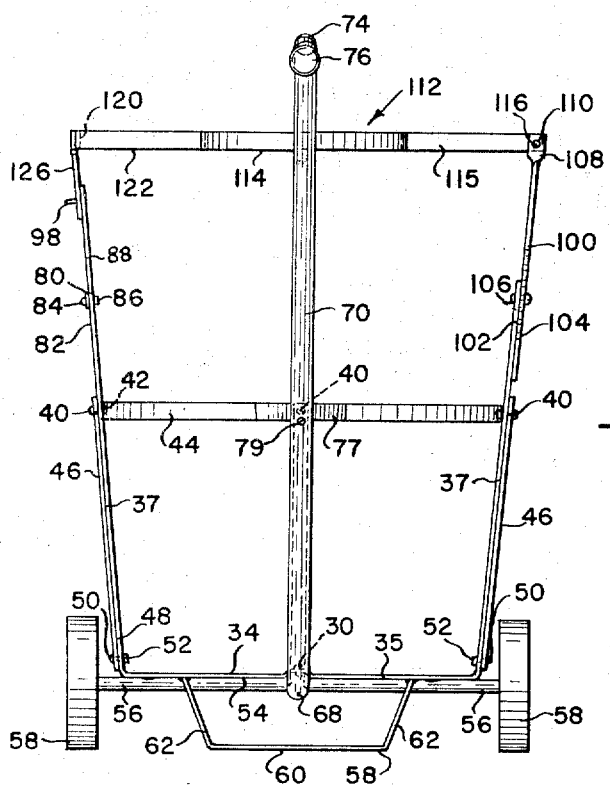
FIGURE 4 is an end elevation of the portable refuse can holder.

Referring to the figures, where like portions of the portable double refuse can holder of the present invention are given like numerical designations to facilitate a description thereof, a centrally located longitudinal strap member 10 having a horizontal portion 12 and upstanding legs 14 and 16 is provided to serve as the basic frame member. The legs 14 and 16 are of substantially the same length and diverge slightly at their upper ends 18, as illustrated best in FIGURE 2, to substantially conform to the truncated cone configuration of the conventional refuse can.

A further upstanding strap member 20, located substantially midway between the legs 14 and 16 and coplanar therewith, is suitably secured, such as by welding to the upper surface 22 of the bottom or horizontal portion 12 of the longitudinal member 10. The upstanding member 20 is disposed substantially perpendicular to the surface 22 of strap member 10 and is of a length sufficient for its upper end 24 to rise vertically substantially the same distance above the horizontal portion 12 as the ends 18 of the legs 14 and 16 of the longitudinal strap member 10.

A pair of substantially identical U-shaped transverse strap members 26 and 28 are disposed with their horizontal or bottom portions 35 immediately adjacent the bottom portion 12 of the longitudinal strap member 10 and respectively equidistant between the leg 14 and the upstanding member 20 and between the upstanding member 20 and the leg 16 in a plane normal to the plane of the longitudinal strap member.

The transverse strap members 26 and 28 may be secured to the longitudinal strap member 10 at the point where they cross as by means of a bolt 30 inserted through aligned apertures into threaded engagement with a suitable nut 32. The transverse members 26 and 28 may be permanently deformed at this juncture so that the upper surfaces 34 thereof are substantially coplanar with the upper surface 22 of the horizontal portion 12 of the longitudinal strap member 10. These surfaces 22 and constitute the support for the bottom of the refuse n.

Both of the transverse members 26 and 28 are sub-ıntially U-shaped in configuration with the bottom ırtion 35 being substantially one-half the length of the ıttom portion 12 of the longitudinal member 10 and tending equidistant on opposite sides thereof. The up-ınding legs 37 of the transverse members 26 and 28 e substantially the same length and are approximately ıe-third longer than the legs 14 and 16 of the longi-dinal member 10. Like the legs 14 and 16 of the longi-dinal member 10, the legs 37 of the transverse mem-rs 26 and 28 may diverge slightly so as to conform to e shape of the conventional refuse can.

A horizontally disposed, endless strap member 36 in e form of a circular ring is secured to the end 18 of e leg 14 of the longitudinal member 10, the end 24 of e upstanding 20, and the legs 37 of the transverse ember 26 at substantially the same height above the rfaces 22 and 34. The points at which the ring member ı is secured to the longitudinal and transverse members ı and 26 are spaced approximately 90°. The means of tachment may be varied as desired, but may convenient-take the form of bolts 40 extending through aligned ıertures into threaded engagement with suitable nuts 12. ıe diameter of the ring member 36 is, of course se-:ted to accommodate the conventional refuse can at that ight above the surfaces 22 and 34.

A second endless member 44 identical in every re-ect to the ring member 36 is secured to the end 18 the leg 16, the end 24 of the upstanding member 20, d the legs 37 of the transverse member 28 by means threaded bolts 40 and nuts 42 similar to those earlier scribed, or the same as, where appropriate.

The ring members 36 and 44 are thus disposed sub-ıntially coplanar and are secured fore and aft to the ds 18 of the legs 14 and 16 of the longitudinal strap ember 10, to each other, and to the end 24 of the up-ınding member 20 in the center of the holder, and to e legs 37 of the transverse members 26 and 28 on ıth sides thereof. The ring members 36 and 44 need not mutually secured to the upstanding strap member 20 t some means must be provided to prevent longitudi-l separation of the ring members 36 and 44.

Additional rigidity is provided by use of a diagonal brace ı secured to the point at which the ring member 44 is cured to the legs 37 of the transverse member 28 by e same bolts 40 and 42 and to the lower end 48 of the gs 37 of the transverse member 26 by other bolts 50 d nuts 52 of like character.

An axle bar 54 spans the bottom portion 35 of the rward transverse member 26 in an underyling relation-ip thereto. The axle bar 54 may be welded or other-se secured to the horizontal portion 35 in any conven-ınal manner with the ends 56 thereof projecting out-ırdly beyond the legs 27 of the transverse member 26. wheel 58 is freely journaled on each of the outwardly tending ends 56 of the axle bar 54 to support the lower ıttom portion 35 of the transverse strap member 26, a spaced relation to the surface upon which the holder sts.

A support 58 comprises a surface contacting portion 60 ıd a pair of lightly diverging legs 62 is secured to the ıttom portion 35 of the transverse strap member 28 any conventional manner as by welding. The legs 62 the support 58 are substantially equal in length to e radius of the wheels 58 journaled on the ends 56 of e axle bar 54 so that the plane of the refuse can sup-ırting surfaces 22 and 34 of the longitudinal and trans-ırse strap members 10 and 26 and 28 is substantially ırallel to the surface upon which the holder rests.

The bottom portion 68 of an elongated handle 70 secured to the horizontal portion 12 of the longitudinal ap member 10 in proximity to the leg 16 by means a pair of bolts 64 extending through aligned apertures into threaded engagement with suitable nuts 66. The handle 70 includes an upstanding portion 72 which extends upwardly in the plane of the longitudinal strap member 10. The upstanding portion 72 of the handle 70 may diverge slightly from the leg 16 of the longitudinal member 10 and the upper end 74 thereof may be bent rearwardly to provide a suitable hand grip for lifting the support 58 clear of the surface upon which the holder rests so that the holder may be rolled on the wheels 58. A cap 76 of rubber or plastic material may be optionally provided on the extreme end 76 of the handle 70.

The handle 70 is secured to the ring member 44 by means of a curved brace 77 welded or otherwise secured at its extremities to spaced points on the ring member 44. The brace 77 may be apertured to receive a bolt 79 inserted through an aligned aperture in the upstanding portion 72 of the handle 70 into threaded engagement with a suitable nut 81.

A strap member 80 is secured to the upper extremities 82 of the upstanding portions 37 of the transverse members 26 and 28 along one side of the holder as by means of bolts 84 extending through aligned apertures into threaded engagement with suitable nuts 86.

A vertically adjustable strap member 88 is secured to the strap member 80 substantially half way between the extremities 82 of the legs 37 of the transverse members 26 and 28 at a substantially 90° angle. The vertical adjustment of the member 88 may be accomplished by means of a plurality of vertically spaced apertures 90, one of which may be moved into alignment with an aperture 92 in the member 80 for the insertion of a bolt 94 therethrough into threaded engagement with a nut (not shown). The height of the upper end 96 of the member 88 may thus be readily adjusted with respect to the member 80. A suitable eye 98 may be secured in any conventional manner as by welding to the upper extremity 96 of the vertically adjustable member 88.

A pair of vertically adjustable extensions 100 are secured to the upper extremities 102 of the legs 37 of the transverse strap members 26 and 28 on the other side of the holder. The extensions 100 may be provided with a plurality of vertically spaced apertures 104 for selective alignment with an aperture 106 in the extremities 102 of the legs 37 so that the height of the upper extremities 108 of the extensions 100 may be readily adjusted with respect to the holder. The upper extremities 108 of the extensions 100 may conveniently be twisted 90° so that the axis of an aperture 110 therein lies substantially parallel to the longitudinal axis of the holder.

A refuse can cover securing yoke 112 comprises a pair of endless strap members 114 in the form of circles substantially centered vertically over the bolts 30 used to secure the longitudinal strap member 10 to the transverse strap members 26 and 28. Each of the ring members 114 is approximately one half the size of the ring members 36 and 44 in diameter.

Both of the ring members 114 are secured in a conventional manner, as by welding, to a transverse member 115. Each of the members 115 is hingedly secured to the upper extremity 108 of one of the extensions 100 of the transverse strap members 26 and 28 by means of a hinge bolt 116 extending through an aligned aperture therein.

A U-shaped member 18 comprising a longitudinally extending portion 120 and transversely extending legs 122 is disposed substantially coplanar with the ring members 114. The ends 124 of the legs 122 of the member 118 are secured to the ring member 114 in a conventional manner, as by welding.

A hasp 126 is secured, as by welding, to depend from the longitudinally extending portion 120 of the member 118. The hasp 126 has an elongated aperture 128 which cooperates in a conventional manner with the eye 98 of the adjustable strap member 88 to latch the refuse can cover securing yoke 112 in a closed position. A bolt or padlock (not shown) may be inserted over the hasp 126 and through the eye 98 if additional security is desired.

From the foregoing description, it is clear that the double refuse holder of the present invention is extremely simple, lightweight and durable in its construction while providing security and easy transportation of the refuse cans. It is to be understood that the refuse can cover securing yoke may be hinged from the side of the holder opposite to that illustrated, and that the present invention may be embodied in other specific forms without departing from the spirit of the invention or essential characteristics thereof. The present embodiment is, therefore, to be considered in all respects as illustrative and not restrictive, the scope of the invention being indicated by the appended claims rather than by the foregoing description.

What is claimed is:

1. A portable refuse can holder comprising:

a longitudinal U-shaped member having a substantially horizontal portion and upstanding legs of equal length;

a pair of longitudinally spaced transverse U-shaped members each having a substantially horizontal portion and upstanding legs of equal length, the horizontal portion of each of said transverse members being mounted near its midpoint to the horizontal portion of said longitudinal member, the horizontal portions of said transverse members being substantially coplanar with and disposed substantially normal to the horizontal portion of said longitudinal member to support a refuse can, the legs of said transverse members extending upwardly at least as high as the legs of said longitudinal member;

a pair of endless ring members each secured to one of the legs of [sad] *said* longitudinal member and the legs of one of said transverse members;

means for maintaining said ring members in a longitudinally fixed relation to each other;

wheel means located under one of said transverse members;

ground engaging support means mounted at the other one of said transverse members;

a handle mounted to the horizontal portion of said longitudinal member at the end thereof adjacent said other transverse member, said handle extending upwardly and outwardly from said holder along the longitudinal axis thereof;

means to limit the longitudinal separation of said handle from said ring members;

hinge means mounted on the legs of said transverse members on one side of said longitudinal member;

a unitary member connected to said hinge means, said unitary member having surfaces adapted to maintain covers on the refuse cans when said unitary member is *in a* closed position and to allow removal of the refuse can from the holder when said unitary member is in an open position; and latch means supported by the leg of at least one of said transverse members on the other side of said longitudinal member for maintaining said unitary member in a closed position.

2. The holder of claim 1 including an upstanding *member* mounted on the horizontal portion of said longitudinal member near the midpoint thereof and extending upwardly into engagement with said ring member maintaining means.

3. The holder of claim 1 wherein said unitary member includes a pair of endless substantially circular members and means supporting said circular members substantially coaxial with said ring members when said unitary member is in a closed position.

4. The holder of claim 3 wherein said circular members are disposed substantially coplanar and have a diameter substantially less than the diameter of said *ring* members; and wherein said ring member maintaining means includ an upstanding member mounted on the horizont portion of said longitudinal member near the mi point thereof.

5. The holder of claim 1 including a diagonal bra secured to one leg of said other transverse member a first point and to the leg of said one transverse mer ber on the same side of said longitudinal member as sa one leg at a second point, said first and second poir being vertically spaced with respect to the horizont portion of said longitudinal member.

6. The holder of claim 1 wherein said latch means i cludes:

an elongated member secured to the upper extremiti of the legs of said transverse members on said oth side of said longitudinal member;

means secured to said elongated member includir an eye; and means including a hasp secured to said unitary mer ber, said hasp being adapted to engage said e when said unitary member is in a closed positio

7. The holder of claim 6 wherein the spacing betwe said eye and said elongated member is adjustable, ar wherein said unitary member is connected to the upp extremities of the legs of said transverse members b way of adjustable extensions whereby the vertical spa ing between said circular members and the bottoms of sa longitudinal and transverse members may be adjusted adapt the holder to refuse cans of different heights.

8. The holder of claim 7 including a diagonal bra secured to one leg of said other transverse member at first point and to the leg of said one transverse memb on the same side of said longitudinal member as sa one leg at a second point, said first and second poin being vertically spaced with respect to the horizont portion of said longitudinal member, and wherein sa unitary member includes two members each connected one end thereof to said hinge means and at the oth end thereof to one of said circular members, and a U shaped member having a horizontal portion and legs equal length, each of said legs of said last mentioned U shaped member being secured to one of said circul members approximately 180° around the circumferen thereof from said hinge means connected member to sa last mentioned U-shaped member being disposed substa tially coplanar with said circular members, said hasp b ing secured to the horizontal portion of said last me tioned U-shaped member.

*9. A portable refuse can holder comprising:*

*a longitudinal U-shaped member having a substantiall horizontal portion and upstanding legs;*

*a pair of longitudinally spaced transverse U-shape members each having a substanitally horizontal po tion and upstanding legs, the horizontal portion each of said transverse members being mounted ne its midpoint to the horizontal portion of said long tudinal member, the horizontal portions of said tran verse members being substantially coplanar with an disposed substantially normal to the horizontal po tion of said longitudinal member to support a refu can;*

*a pair of ring members each secured to one of the leg of said longitudinal member and the legs of on of said transverse members;*

*means for maintaining said ring members in a longitu dinally fixed relation to each other;*

*wheel means located adjacent one of said transvers members;*

*ground engaging support means mounted at the othe one of said transverse members;*

*a handle mounted to the horizontal portion of sai longitudinal member at the end thereof adjacent sai other transverse member, said handle extending up wardly and outwardly from said holder along th longitudinal axis thereof;*

*means to limit the longitudinal separation of said handle from said ring members;*

*hinge means mounted on the legs of said transverse members on one side of said longitudinal member;*

*a unitary member connected to said hinge means, said unitary member having surfaces adapted to maintain covers on the refuse cans when said unitary member is in a closed position and to allow removal of the refuse can from the holder when said unitary member is in an open position; and*

*latch means supported by the leg of at least one of said transverse members on the other side of said longitudinal member for maintaining said unitary member in a closed position.*

*10. A portable refuse can holder comprising:*

*a longitudinal U-shaped member having a substantially horizontal portion and upstanding legs;*

*a pair of longitudinally spaced transverse U-shaped members each having a substantially horizontal portion and upstanding legs, the horizontal portion of each of said transverse members being mounted near its mid-point to the horizontal portion of said longitudinal member, the horizontal portions of said transverse members being substantially coplanar with and disposed substantially normal to the horizontal portion of said longitudinal member to support a refuse can, the legs of said transverse members extending upwardly at least as high as the legs of said longitudinal member;*

*a pair of ring members each secured to one of the legs of said longitudinal member and the legs of one of said transverse members;*

*means for maintaining said ring members in a longitudinally fixed relation to each other;*

*ground engaging wheel means;*

*a handle mounted to the horizontal portion of said longitudinal member at the end thereof adjacent said other transverse member, said handle extending upwardly and outwardly from said holder along the lonigtudinal axis thereof;*

*hinge means mounted on the legs of said transverse members on one side of said longitudinal member;*

*a unitary member connected to said hinge means, said unitary member having surfaces adapted to maintain covers on the refuse cans when said unitary member is in a closed position and to allow removal of the refuse can from the holder when said unitary member is in an open position; and*

*latch means for maintaining said unitary member in a closed position.*

*11. A portable refuse can holder comprising:*

*a longitudinal U-shaped member having a substantially horizontal portion and upstanding legs;*

*a pair of longitudinally spaced transverse U-shaped members each having a substantially horizontal portion and upstanding legs, the horizontal portion of each of said transverse members being mounted near its mid-point to the horizontal portion of said longitudinal member, the horizontal portions of said transverse members being substantially coplanar with and disposed substantially normal to the horizontal portion of said longitudinal member to support a refuse can;*

*a pair of ring members each secured to one of the legs of said longitudinal member and the legs of one of said transverse members;*

*means for maintaining said ring members in a longitudinally fixed relation to each other;*

*ground engaging wheel means;*

*a handle mounted to the horizontal portion of said longitudinal member at the end thereof adjacent said other transverse member, said handle extending upwardly and outwardly from said holder along the longitudinal axis thereof;*

*hinge means mounted on the legs of said transverse members on one side of said longitudinal member;*

*a unitary member connected to said hinge means, said unitary member having surfaces adapted to maintain covers on the refuse cans when said unitary member is in a closed position and to allow removal of the refuse can from the holder when said unitary member is in an open position; and*

*latch means on the other side of said longitudinal member for maintaining said unitary member in a closed position.*

References Cited

The following references, cited by the Examiner, are of record in the patented file of this patent or the original patent.

UNITED STATES PATENTS

| | | | |
|---|---|---|---|
| 3,235,213 | 2/1966 | Hall | 248—129 |
| 3,292,795 | 12/1966 | Chappell | 280—47.19 |

BENJAMIN HERSH, Primary Examiner

J. A. PEKAR, Assistant Examiner

U.S. Cl. X.R.

211—71; 248—129